Oct. 30, 1928.
F. L. WILLIAMS
1,689,374
MACHINE FOR ELECTRICAL RESISTANCE WELDING OF SHEET METAL PIPE
Filed Sept. 25, 1926    4 Sheets-Sheet 1
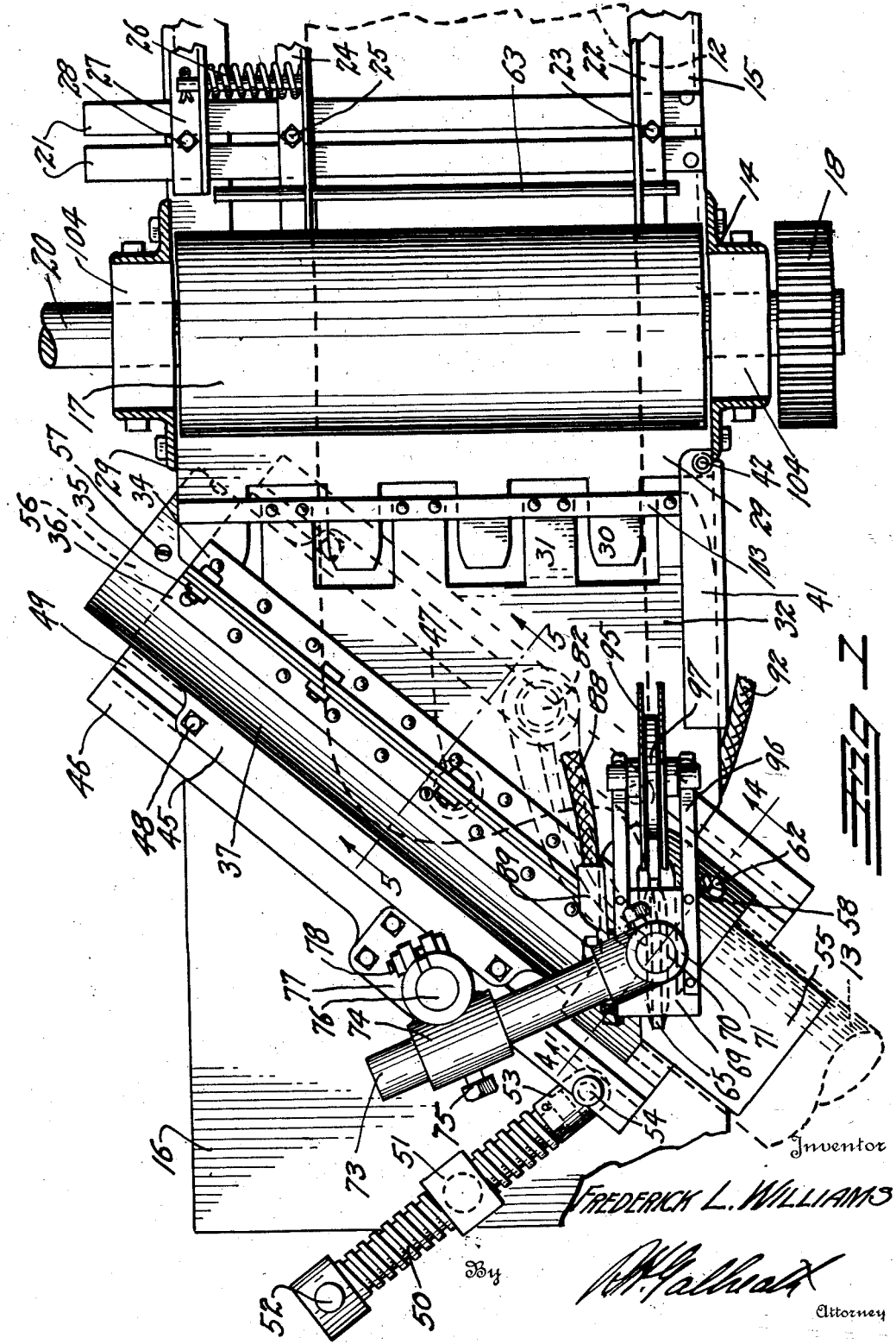
Inventor
FREDERICK L. WILLIAMS
By
Attorney

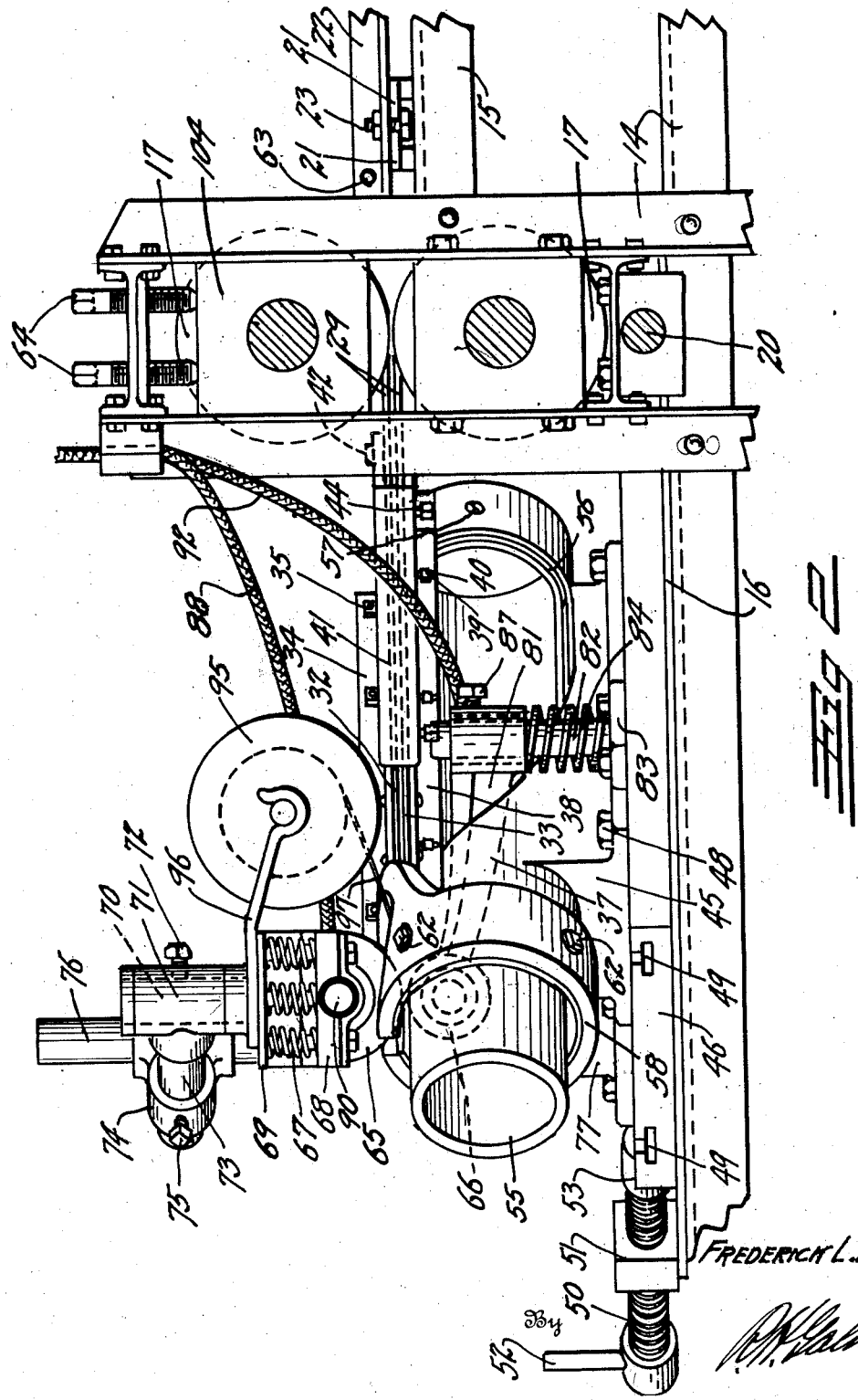

Oct. 30, 1928.
F. L. WILLIAMS
1,689,374
MACHINE FOR ELECTRICAL RESISTANCE WELDING OF SHEET METAL PIPE
Filed Sept. 25, 1926
4 Sheets-Sheet 3
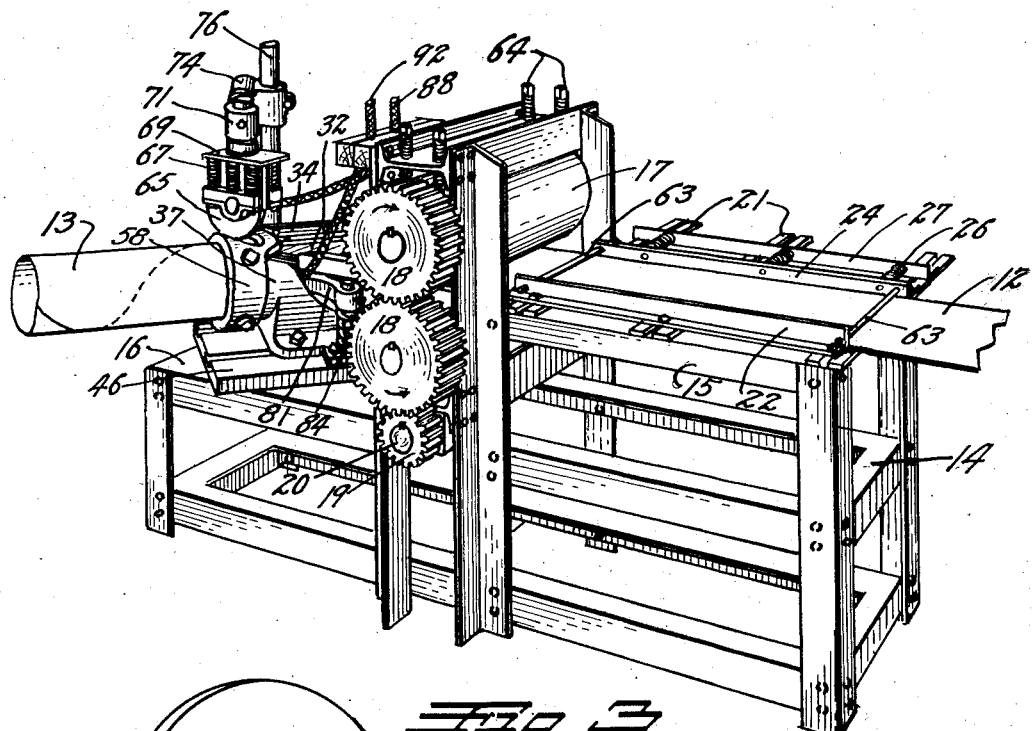
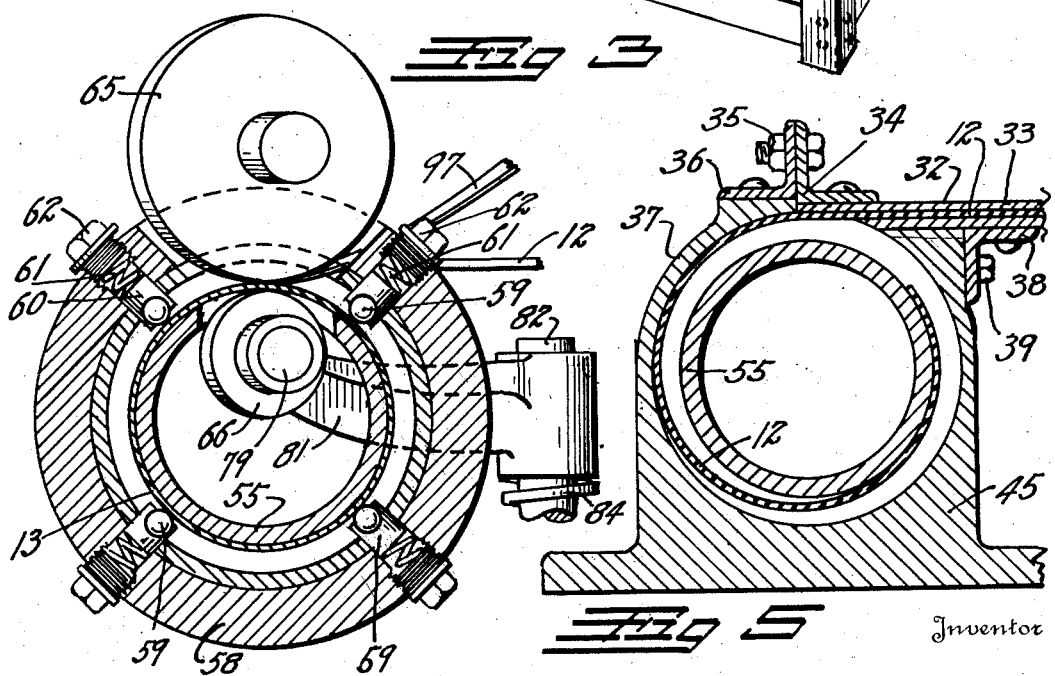
Inventor
FREDERICK L. WILLIAMS
By
Attorney

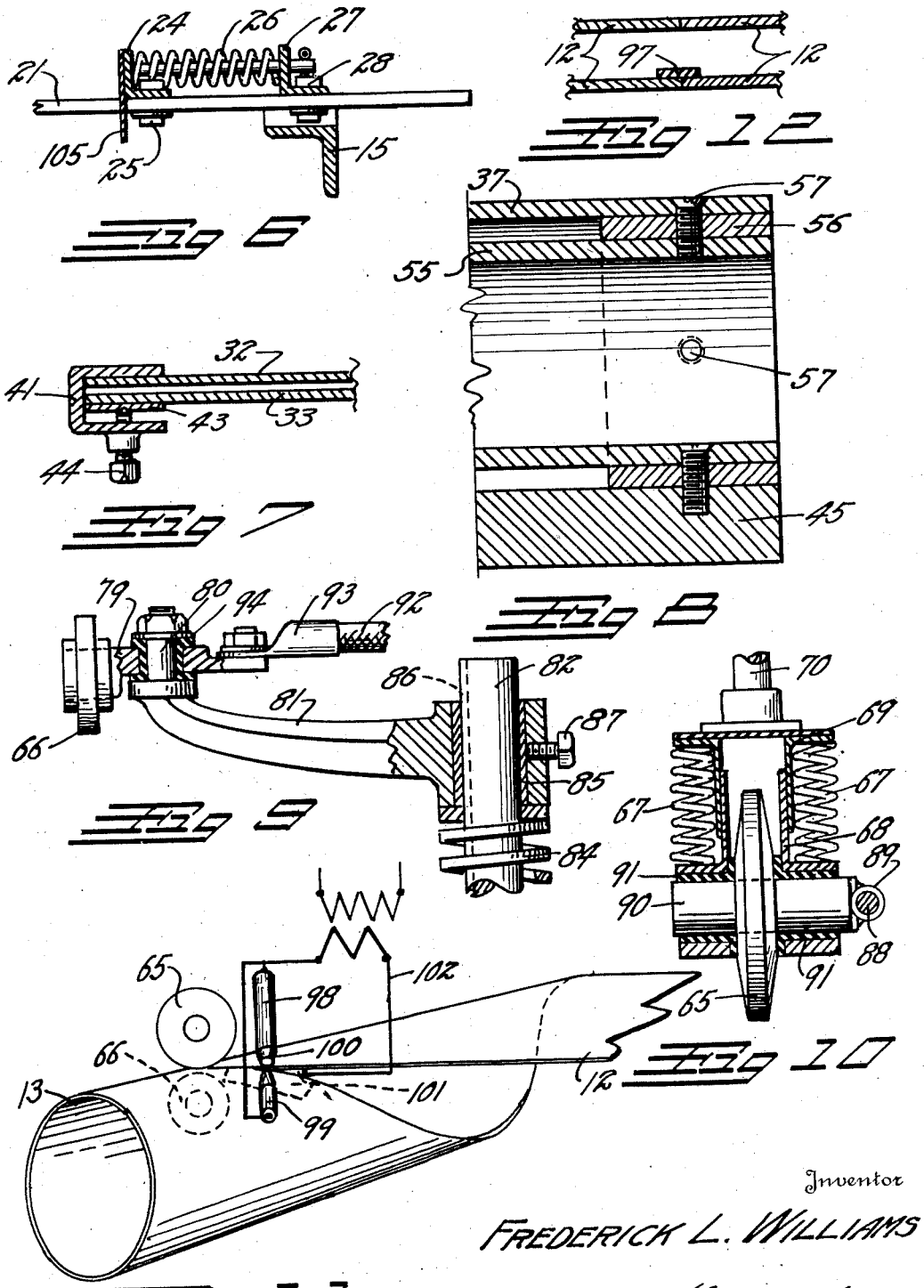

Patented Oct. 30, 1928.

1,689,374

UNITED STATES PATENT OFFICE.

FREDERICK L. WILLIAMS, OF DENVER, COLORADO.

MACHINE FOR ELECTRICAL-RESISTANCE WELDING OF SHEET-METAL PIPE.

Application filed September 25, 1926. Serial No. 137,785.

This invention relates to a machine for forming a strip of sheet metal into a tube or pipe comprising a closed cylindrical spiral and welding the edges of the strip in the spiral. It relates more particularly to machines of the type disclosed in applicant's co-pending applications, Serial Nos. 562,701, 755,766 and to applicant's prior Patent No. 1,583,212.

Present machines which form a tube by forcing a strip of metal into a former at an angle, gauge the size of the tube by the internal diameter of the former. This system results in great inaccuracies in the diameter of the finished pipe, for the former will wear from contact with the strip, gradually allowing the diameter of the finished tube to increase.

Another objection to this method arises from the fact that in changing the gauge of the metal the internal diameter of the pipe is changed and, since all pipe is measured for internal diameter, it is necessary to employ a larger former for a thicker gauge of metal.

The principal object of this invention is to provide a former in which various gauges of metal may be used without varying the internal diameter of the finished pipe.

Another object of the invention is to so construct the former that cross welds and other projections and inaccuracies in the incoming strip will not affect the internal diameter or the roundness of the pipe.

Still another object is to devise means for efficiently welding the spiral seam by means of an electrical resistance weld.

A further object is to provide guides for the incoming strip which will automatically adjust themselves to inaccuracies in the strip width without affecting the alignment of the edge to be welded.

A still further object is to combine in one machine sufficient adjustments and regulations to adapt the same machine to the making of differing diameters of pipe of differing widths of strip having differing thicknesses.

Other objects and advantages reside in the detail construction of the invention which is designed for simplicity, economy and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the forming portion of the invention.

Fig. 2 is a side elevation of the portion illustrated in Fig. 1.

Fig. 3 is a perspective view of the invention.

Fig. 4 is a detail cross section through the former head, taken on the line 4—4, Fig. 1.

Fig. 5 is a similar cross section, taken on the line 5—5, Fig. 1.

Fig. 6 is a detail section through the adjustable strip guide.

Fig. 7 is a detail section through the buckle plate clamp.

Fig. 8 is a detail longitudinal section through one extremity of the former, illustrating the method of attaching the internal former to the external former.

Fig. 9 is a detail view of the inner electrode wheel.

Fig. 10 is a detail view of the outer electrode wheel.

Fig. 11 is a diagrammatic view illustrating an alternate method of forming the spiral weld.

Fig. 12 is a detail cross section through types of joints formed by the machine.

In the drawings the incoming strip, from which the pipe is to be formed, is designated at 12 and the finished pipe at 13. In Fig. 1, the strip and pipe are outlined in broken line.

The machine is mounted on a supporting frame 14 provided at one end with a receiving table 15 and at the other end with a former table 16. Between the receiving table and the former table, two pusher rolls 17 are journaled and arranged to engage the upper and lower surfaces of the strip 12. The rolls 17 are caused to rotate in unison by means of spur gears 18 carried on the extremities of their shafts. The spur gears are driven from a pinion 19 carried on a countershaft 20 which is arranged for connection with any suitable source of power (not shown).

The receiving table 15 contains a plurality of pairs of supporting bars 21, to which, are secured a fixed side guide 22 by means of bolts 23, and a movable side guide 24, by means of bolts 25. The fixed side guide 22 may be adjusted in any position along the supporting bars 21, the bolts 23 being arranged to slide, when loosened, between the supporting bars. The bolts 25 of the movable side guide do not clamp this guide but allow it to be moved along the supporting bars by the irregularities in the width of the sheet 12. The guide 24 is constantly pressed against the edge of the sheet 12 by a series of compression springs 26 which are compressed between the guide 24 and a backing strip 27. The backing strip 27 is adjustably bolted between the pairs of supporting bars 21, at 28. To prevent the side guide 24 from being forced over the edge of the strip 12, a face plate 105 is provided, see Fig. 6, which engages the strip edge and extends below the bars 21.

The strip emerges from the rolls 17 on the former side of the machine between fixed buckle plates 29 which are maintained in close contact with the strip to prevent its buckling. The fixed buckle plates 29 carry projecting sections 30 which pass between similarly projecting sections 31 on an upper and lower movable buckle plate 32 and 33, respectively. A cross bar 103 maintains the sections 30 and 31 in alignment. The upper buckle plate 32 terminates in an angularly placed angle bar 34, which is bolted at 35 to an angle bar 36 which extends longitudinally along the top of an external former 37. The lower buckle plate 33 carries a downwardly projecting angularly placed angle bar 38 which is bolted at 39 to the side of the former.

The bolts 39 pass through vertically slotted holes 40 in the angle 38 so that the space between the upper and lower buckle plates may be regulated to accommodate differing gauges of strip. The upper and lower buckle plates 32 and 33 are prevented from being forced apart at their longest edges by means of a buckle plate clamp 41 pivoted at 42 to the buckle plates 29. The buckle plate clamp 41 is illustrated in detail in Fig. 7 and comprises two jaws arranged to pass above and below the upper and lower buckle plates respectively, the lower jaw being provided with a clamp 43 actuated by a clamp screw 44 by means of which the spacing between the buckle plates may be adjusted and their separation prevented.

The external former 37 is supported on an integral base 45 from a bed plate 46, pivoted to the table 16, at 47. The former is adjustably secured to the bed plate by means of bolts 48 the heads of which ride in T slots 49 in the bed plate 46. The bed plate 46 may be rotated about its pivot 47 on the table 16 by means of a hand screw 50 which is threaded into a bearing 51 pivoted to the table 16. One extremity of the hand screw 50 carries a handle 52, by means of which it may be rotated, the other extremity being rotatably secured in a head 53 which is hinged at 54 to the bed plate 46.

Spaced from the interior wall of the external former is an internal former 55 which is carried on a spacer 56 at one extremity of the external former, bolted by means of suitable bolts 57, as shown in Fig. 8. The internal former preferably extends, at its free end, beyond the end of the external former, as illustrated in Figs. 1 and 2.

Surrounding the free extremity of the external former is a former ring 58, suitably slotted and formed at its top to allow a welding apparatus (to be later described) to contact with the pipe 13. The former ring 58 carries a series of forming rolls 59, carried in depressible bearings 60. The rolls 59 are pressed against the pipe 13 by means of compression springs 61, the compression of which may be adjusted by plugs 62, threaded into the ring 58.

In operation, the guide 22 is set so as to align one edge of the strip 12. The backing strip 27 is brought inwardly until the movable guide 24 snugly engages the opposite edge of the strip 12 and the bolts 28 are tightened. Cross rods 63 are inserted between the guides 22 and 24 so as to hold the strip 12 in place between the guides. The strip is now fed through the pusher rolls 17 and the upper roll adjusted, by means of clamp screws 64 which engage slidable bearings 104 for the shaft of the upper roll. The buckle plates 32 and 33 are now set to the proper spacing for the thickness of the strip 12 and the angle of the bed plate is adjusted, according to the width of the strip, by means of the hand screw 50 so that the strip will emerge in a closed spiral. As the angle of the former is changed, the projecting sections 30 and 31 of the buckle plates will move between each other, there being sufficient space between the sections to accommodate the changes in angle.

The former 37 is now moved longitudinally of the bed plate until the welding point is brought into alignment with the guide 22 where it is clamped in place by means of the bolts 48 in the T slots 49. The strip in being forced into the former by the pusher rolls 17 will contact with the inner face of the external former, as shown in Fig. 5, which will bend it in an arc. In passing through the former ring 58, the former rolls 59 will force the bent strip snugly against the internal former thereby contracting the spiral formed by the external former and forming a closed tube of a fixed internal diameter. This diameter will not be affected by wear on the external former at the point where the bending is done.

It is desired to call attention to the fact that, should the width of the strip 12 vary, the operation of the machine will not be affected, the only result being to press the movable guide 24 against the compression of the springs 26. The alignment of the guiding edge at the guide 22 will remain unchanged.

Should there be cross welds or other projections in the strip 12, or should the thickness of the strip 12 be changed the operation of the machine will not be affected nor will the internal diameter of the finished pipe. There is sufficient space between the internal and external formers to allow for these differences in thickness and the former rolls 59, being flexibly maintained against the strip by the springs 61, will allow the projections and variations in thickness to pass from the machine without affecting the internal diameter of the pipe. To accommodate differing diameters of pipe, differing formers are placed in the machine, the table 16 being arranged sufficiently below the table 15 to accommodate the largest desired diameter. For instance, should a smaller former be used than the one illustrated, the top of the smaller former will occupy the same position as the top of the present former, the only difference being that the base 45 on the smaller former will extend further downward so as to reach the bed plate 46.

The machine thus far described may be employed for any method of welding. The abutting edges within the former ring 58 may be welded by means of a gas torch, an electric arc, or by electrical resistance welding. It is preferred, however, to form this weld by means of the latter process and to accomplish this an outer electrode wheel 65 is arranged to project through an opening in the former ring 58 and the external former 37 to a contact with the strip. Directly under the electrode 65 is an inner electrode wheel 66. The outer electrode 65 is maintained in constant engagement with the rotating strip 12 directly over the contacting edges in the spiral by means of springs 67 which are compressed between a floating bearing 68, which carries the electrode wheel, and an electrode frame 69 supported from a stem 70.

The stem 70 is rotatably mounted in a sleeve 71 in which it may be locked by a set screw 72. The sleeve 71 is carried on the extremity of a horizontal arm 73 which is slidably mounted in a bracket 74, in which, it may be locked by means of a set screw 75. The bracket 74 is vertically slidable upon a standard 76 supported from a base 77 upon the bed plate 46. The bracket 74 may be locked in any desired position on the standard by means of a clamp screw 78. This arrangement allows universal adjustment of the outer electrode wheel 65.

The inner electrode wheel 66 is supported on a bearing 79 pivoted on a stud 80 in the extremity of a supporting arm 81. The supporting arm 81 is supported from a standard 82 which projects upward from a base 83 adjustably bolted to the bed plate 46. The arm 81 extends within both formers through an open side therein. This open side is illustrated in Fig. 2 and comprises that surface of the formers which would not be occupied by the spiralling strip. The inner electrode 66 is maintained in constant engagement with the inner surface of the strip 12 by means of a suitable spring 84 which surrounds the standard 82 and forces upward a sliding bushing 85. The bushing 85 is prevented from rotating on the standard 82 by means of a key-way 86. The arm 81 may be locked in any desired angular position on the bushing 85 by means of a set screw 87. This arrangement allows a universal adjustment to be made of the inner electrode 66.

The two electrodes, with that portion of the strip contained between them, form a part of a closed, low tension, high amperage electric circuit. Current is conducted to the outer electrode through a conductor 88 which terminates in a cable connector 89 on the extremity of a shaft 90, upon which, rotates the outer electrode wheel 65. The shaft 90 is insulated from the bearing 68 by means of suitable insulating bushings 91. Current is conducted to the inner electrode wheel 66 through a conductor 92 which terminates in a cable connector 93 bolted to the bearing 79 as shown in Fig. 9, suitable insulating bushings 94 being provided to insulate the bearings 79 from the stud 80.

The resistance at the point of contact between the electrode wheels and the sheet causes the metal of the plate to become heated to a welding temperature. The pressure of the wheels at this point will force the semi-fluid edges of the strip together forming a homogeneous weld on a spiral line throughout the length of the pipe. This weld is illustrated in the upper view of Fig. 12. Should it be desired to reinforce this weld, means may be provided for inserting additional welding material at this point. One method of inserting this material is illustrated in Figs. 1, 2 and 4, in which a reel 95 is carried on brackets 96 from the electrode frame 69. The reel 95 contains a roll of flat metallic wire 97 which feeds from the reel between the outer electrode wheel and the strip, directly over the joint between the contacting spiral edges. The wire 97 will become heated to the welding temperature and become fused with the edges forming a spiral bead on the exterior of the pipe throughout its length. This weld is illustrated in the lower view of Fig. 12.

In Fig. 11 I have illustrated an alternate method of forming the weld. In this method the machine previously described is employed, but in addition two rotating bar electrodes 98 and 99 are used. These electrodes set at an angle to the traveling edge and have beveled extremities 100 which travel along the edge of the strip. Directly under the approaching edges of the strip a stationary shoe 101, of copper or similar material, is placed. The electrodes 98 and 99 and the shoe 101 form part of a secondary electric circuit 102. The purpose of these electrodes is to bring the strip edges to a welding temperature before they reach the wheels 65 and 66, the primary function of the wheels in this form being to roll the heated edges together and complete the weld. In addition to the pressure obtained by the wheels 65 and 66 additional pressure may be placed on the joint by changing the angle of the former so as to cause the edge of the oncoming strip to be pressed against the edge of the strip previously rolled. Should the electrodes 98 and 99 provide sufficient heat the wheels 65 and 66 need ot carry electricity but for heavy gauge metal where additional heat is necessary both the electrodes 98 and 99 and electrode wheels 65 and 66 should be connected in the electric circuit.

While a specific form of the improvement has been described and illustrated herein, it is desired to be understood that the same may be varied, within the scope of the appended claims, without departing from the spirit of the invention.

Having thus described the invention what I claim and desire to secure by Letters Patent is:—

1. In a tube forming device having pushing rolls and an external former adapted to receive a strip of metal on its interior from said rolls and form same into a spiral; an internal former spaced from said external former; and means surrounding said internal former and adapted to force said spiral away from said external former and against said internal former.

2. In a tube forming device having pushing rolls and an external former adapted to receive a strip of metal on its interior from said rolls and form same into a spiral; an internal former spaced from said external former; and means surrounding said internal former and adapted to force said spiral away from said external former and against said internal former, said means comprising members adapted to contact with said spiral, said members arranged to project inwardly from said external former adjacent the delivering extremity thereof.

3. In a tube forming device having pushing rolls and an external former adapted to receive a strip of metal on its interior from said rolls and form same into a spiral; an internal former spaced from said external former; and means surrounding said internal former and adapted to force said spiral away from said external former and against said internal former, said means comprising members adapted to contact with said spiral, said members arranged to project inwardly from said external former adjacent the delivering extremity thereof, said members comprising bearings adapted to contact with said spiral; and resilient means adapted to maintain said bearings in contact with said spiral.

4. In a tube forming device having pushing rolls and an external former adapted to receive a strip of metal on its interior from said rolls and form same into a spiral; an internal former spaced from said external former; means surrounding said internal former and adapted to force said spiral away from said external former and against said internal former, said means comprising members adapted to contact with said spiral, said members arranged to project inwardly from said external former adjacent the delivering extremity thereof, said members comprising bearings adapted to contact with said spiral; resilient means adapted to maintain said bearings in contact with said spiral; and adjustable means for varying pressure of said resilient means on said bearings.

5. In a tube forming device having rolls adapted to force a strip of sheet metal into a former for forming same in a spiral; buckle plates arranged immediately below and above said strip between said rolls and said former; and means for varying the separation of said buckle plates comprising a rigid member fixed to one of said plates and an adjusting screw carried by said rigid member and arranged to force another of said plates toward the former plate and prevent separation of said plates.

6. In a tube forming device having rolls adapted to force a strip of sheet metal into a former for forming same in a spiral; buckle plates arranged immediately above and below said strip between said rolls and said former; and means for varying the separation of said buckle plates, said buckle plates being formed in two sections, one section being in fixed relation to said rolls, and the other section being in fixed relation to said former, each of said sections having portions adapted to pass between similar portions on the other of said sections.

7. In a tube forming device having rolls adapted to force a strip of sheet metal into a former for forming same in a spiral; buckle plates arranged immediately above and below said strip between said rolls and said former; means for varying the separation of said buckle plates, said buckle plates being formed in two sections, one section being in fixed relation to said rolls, and the other section being in fixed relation to said former; and clamping means adapted to extend over both of said sections of both said buckle plates to maintain all of said sections in substantial contact with said strip.

8. A tube forming device comprising a supporting frame; a receiving table; a former table; both said tables being supported by said frame; a bed plate pivoted to said former table; a former carried by said bed plate; rolls adapted to force a strip of sheet metal from said receiving table into said former; and means for rotating said bed plate about its pivot.

9. A tube forming device comprising a supporting frame; a receiving table; a former table; both said tables being supported by said frame; a bed plate pivoted to said former table; a former carried by said bed plate; rolls adapted to force a strip of sheet metal from said receiving table into said former; and means for rotating said bed plate about its pivot, said means comprising a hand screw pivoted at one point to said former table and at another point to said bed plate.

10. A tube forming device comprising a supporting frame; a receiving table; a former table; both said tables being supported by said frame; a bed plate pivoted to said former table; a former carried by said bed plate; rolls adapted to force a strip of sheet metal from said receiving table into said former; and means for rotating said bed plate about its pivot, said former being longitudinally adjustable on said bed plate.

11. In a tube forming device, pusher rolls adapted to force a strip of sheet metal into a former; a receiver table adapted to support said strip before said rolls; a guide adjustably supported on said receiving table and adapted to contact with one edge of said strip; a second guide slidably carried on said table and adapted to contact with the other edge of said strip; and resilient means arranged to force said second guide into contact with said strip.

12. In a tube forming device, pusher rolls adapted to force a strip of sheet metal into a former; a receiver table adapted to support said strip before said rolls; a series of spaced bars carried by said receiving table, there being slots between said bars; and guides adapted to contact with the edges of said strip, said guides being adjustably secured in said slots.

13. In a tube forming device, pusher rolls adapted to force a strip of sheet metal into a former; a receiver table adapted to support said strip before said rolls; a series of spaced bars carried by said receiving table, there being slots between said bars; and guides adapted to contact with the edges of said strip, one of said guides being fixed against one edge of said strip, another of said guides being flexibly pressed against the other edge of said strip, its direction being guided by said slots.

14. In a tube forming device having a former adapted to form a strip of sheet metal into a spiral; an electrode wheel arranged immediately above the contacting point of the edges in the spiral; and a support for said wheel; a standard; said support being vertically and radially adjustable upon said standard.

15. In a tube forming device having a former adapted to form a strip of sheet metal into a spiral; a pivoted bed plate adapted to support said former; means for rotating said bed plate and locking it in any desired position; an electrode wheel arranged immediately over the contacting edges in said spiral; a supporting arm adjustably supporting said electrode wheel; a standard carried by said bed plate, said supporting arm being vertically and radially adjustable on said standard.

16. In a tube forming device having a former adapted to form a strip of sheet metal into a spiral; a pivoted bed plate adapted to support said former; means for rotating said bed plate and locking it in any desired position; an electrode wheel supported immediately under the contacting edges in said spiral; an arm adapted to support said wheel from a point without said former; and resilient means for pressing said wheel against said spiral.

17. In a tube forming device having a former adapted to form a strip of sheet metal into a spiral; a pivoted bed plate adapted to support said former; means for rotating said bed plate and locking it in any desired position; an electrode wheel supported immediately under the contacting edges in said spiral; an arm adapted to support said wheel from a point without said former; a standard carried by said bed plate so as to support said arm; and resilient means arranged to force said arm upwardly on said standard.

18. In a tube forming device having pushing rolls and an external former adapted to receive a strip of metal on its interior from said rolls and form same into a spiral; an internal former spaced from said external former; and means adapted to force said spiral away from said external former and against said internal former.

19. In a tube forming device having pushing rolls and an external former adapted to receive a strip of metal on its interior from said rolls and form same into a spiral; an internal former spaced from said external former; and means adapted to force said spiral away from said external former and against said internal former, said means comprising members adapted to contact with said spiral, said members arranged to project inwardly from said external former.

20. In a tube forming device having rolls adapted to force a strip of sheet metal into an external former for forming same in a spiral; an internal mandrel in said external former adapted to determine the internal diameter of said spiral; and means for forcing said spiral against said mandrel.

21. In a tube forming device having rolls adapted to force a strip of sheet metal into an external former for forming same in a spiral; an internal mandrel in said external former adapted to determine the internal diameter of said spiral; and means for forcing said spiral against said mandrel; said means comprising members adapted to contact with the exterior of said spiral and resilient means arranged to force said members against said spiral.

In testimony whereof, I affix my signature.

FREDERICK L. WILLIAMS.